July 23, 1968  T. A. GREULICH  3,393,761
ARTICULATED WARFARE VEHICLE
Filed Nov. 16, 1966  3 Sheets-Sheet 1
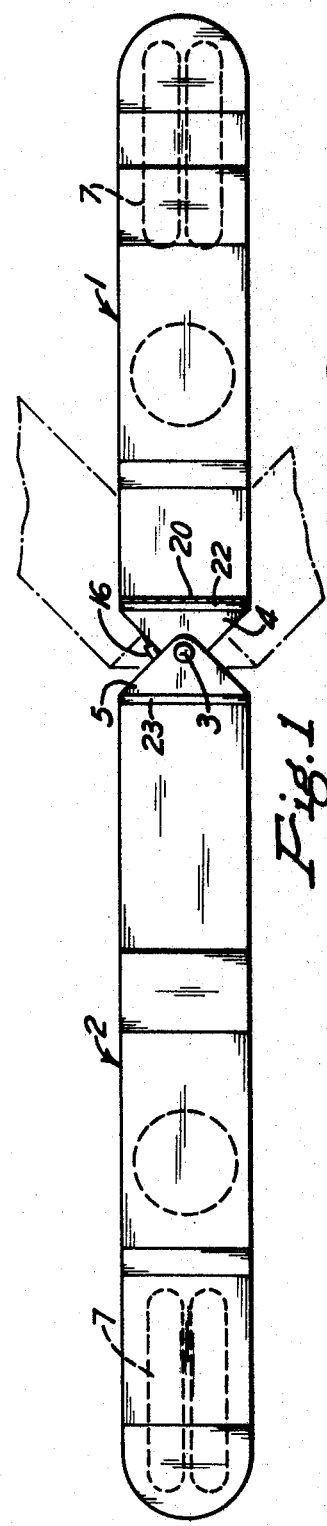
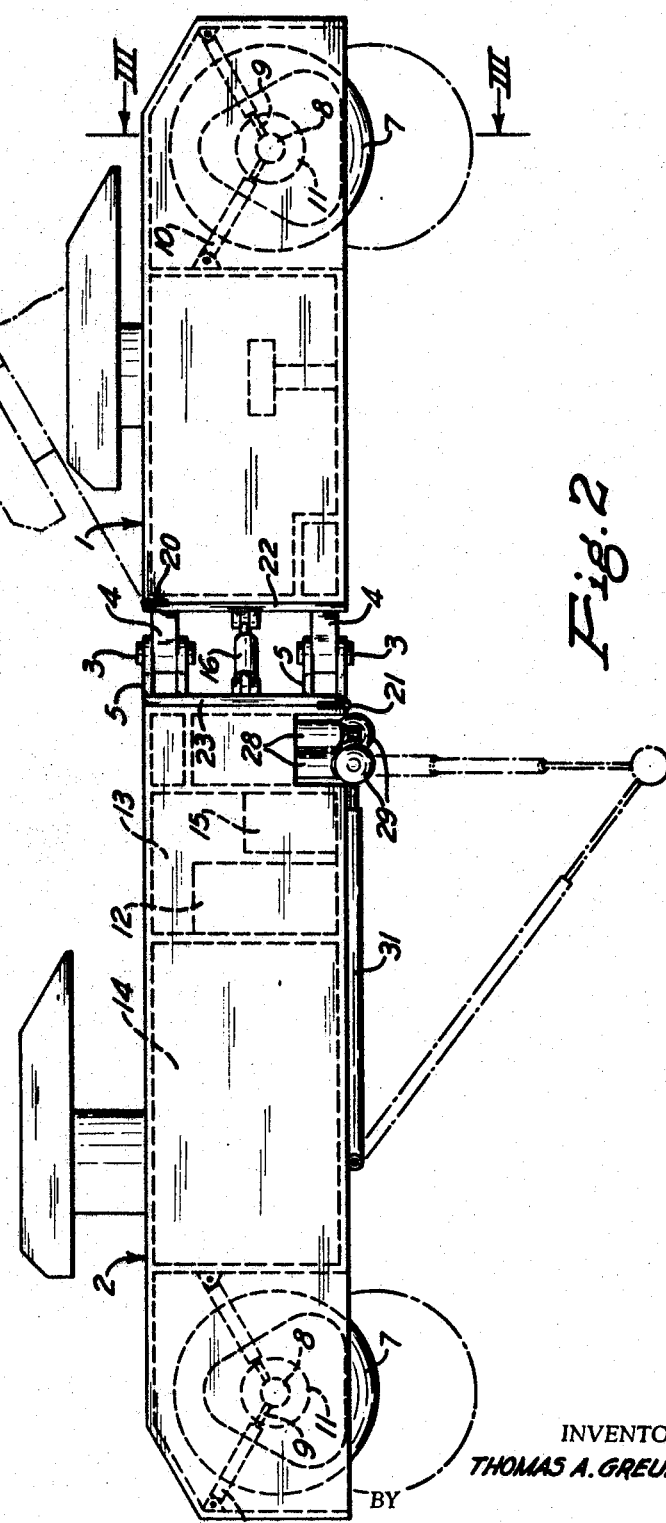
INVENTOR.
THOMAS A. GREULICH
BY
Brown, Critchlow, Flick & Peckham
ATTORNEYS.

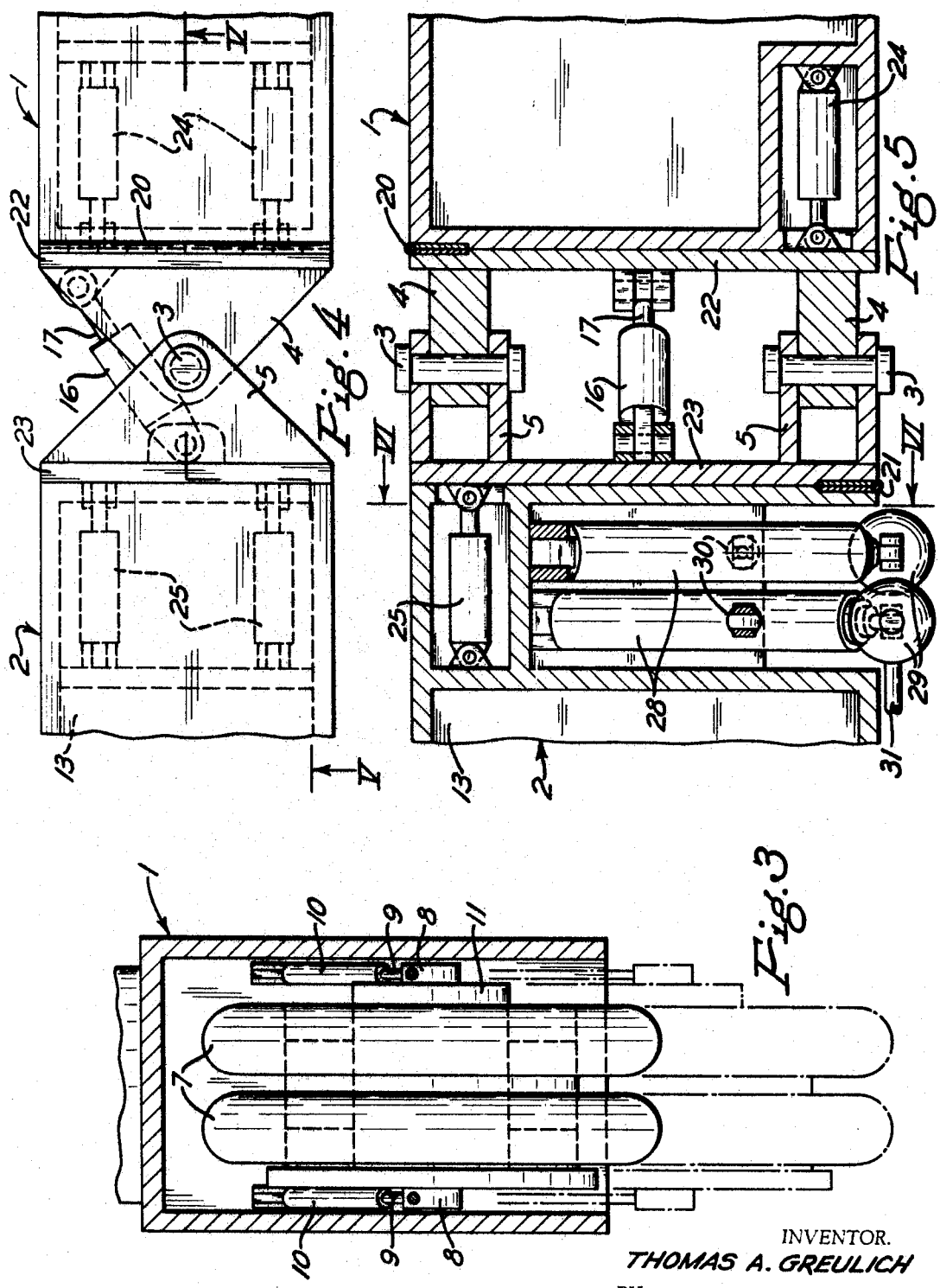

July 23, 1968  T. A. GREULICH  3,393,761
ARTICULATED WARFARE VEHICLE
Filed Nov. 16, 1966  3 Sheets-Sheet 3

INVENTOR.
THOMAS A. GREULICH
BY
Brown, Critchlow, Flick & Peckham
ATTORNEYS.

3,393,761
Patented July 23, 1968

3,393,761
ARTICULATED WARFARE VEHICLE
Thomas A. Greulich, Fox Chapel Borough, Pa.
(144 Spring House Lane, Pittsburgh, Pa. 15238)
Filed Nov. 16, 1966, Ser. No. 594,902
9 Claims. (Cl. 180—51)

ABSTRACT OF THE DISCLOSURE

This invention relates to vehicles, and more particularly to armoured self-propelled vehicles for the use of military personnel. The vehicle comprises a front and rear section interconnected by a hinge mechanism which permits the swinging of one section relative to the other section in both a horizontal plane about a vertical axis and a vertical plane about a transverse horizontal axis. Outrigger struts secured to one of the sections are operable to provide for stabilization of the vehicle when traversing uneven terrain.

Background of the invention

Tanks are used in warfare to carry heavy guns and to protect those who operate them and drive the tanks, but such tanks are much too large for many operations, including scouting activities. Merely reducing their size is not satisfactory, because even small tanks may not be maneuverable between trees and other obstructions.

Summary of the invention

In accordance with this invention, aligned elongated front and rear armoured vehicle body sections are hinged together end to end on a vertical axis. Driven wheels are journaled in the rear end of the rear section and the front end of the front section and project below them. Between the body sections are means for swinging their hinged ends laterally in order to steer the vehicle. Connected to the front end of the rear section are normally retracted outrigger legs that can be projected laterally from opposite sides of the vehicle into contact with the ground to stabilize the vehicle. The body sections of the vehicle also are hinged together on a horizontal transverse axis to permit the front section to be swung upwardly. It is among the objects of this invention to provide an armoured warfare vehicle which is extremely low and narrow for its length, which is readily maneuverable over rough terrain, which is stable, and which is no larger than required for holding two men.

Brief description of the drawings

The preferred embodiment of the invention is illustrated in the accompanying drawings, in which
FIG. 1 is a plan view of the vehicle;
FIG. 2 is a side view thereof;
FIG. 3 is a vertical section taken on the line III—III of FIG. 2;
FIG. 4 is an enlarged fragmentary plan view of the connection between the body sections of the vehicle;
FIG. 5 is a vertical section taken on the line V—V of FIG. 4.

Description of the preferred embodiment

Figure 6:
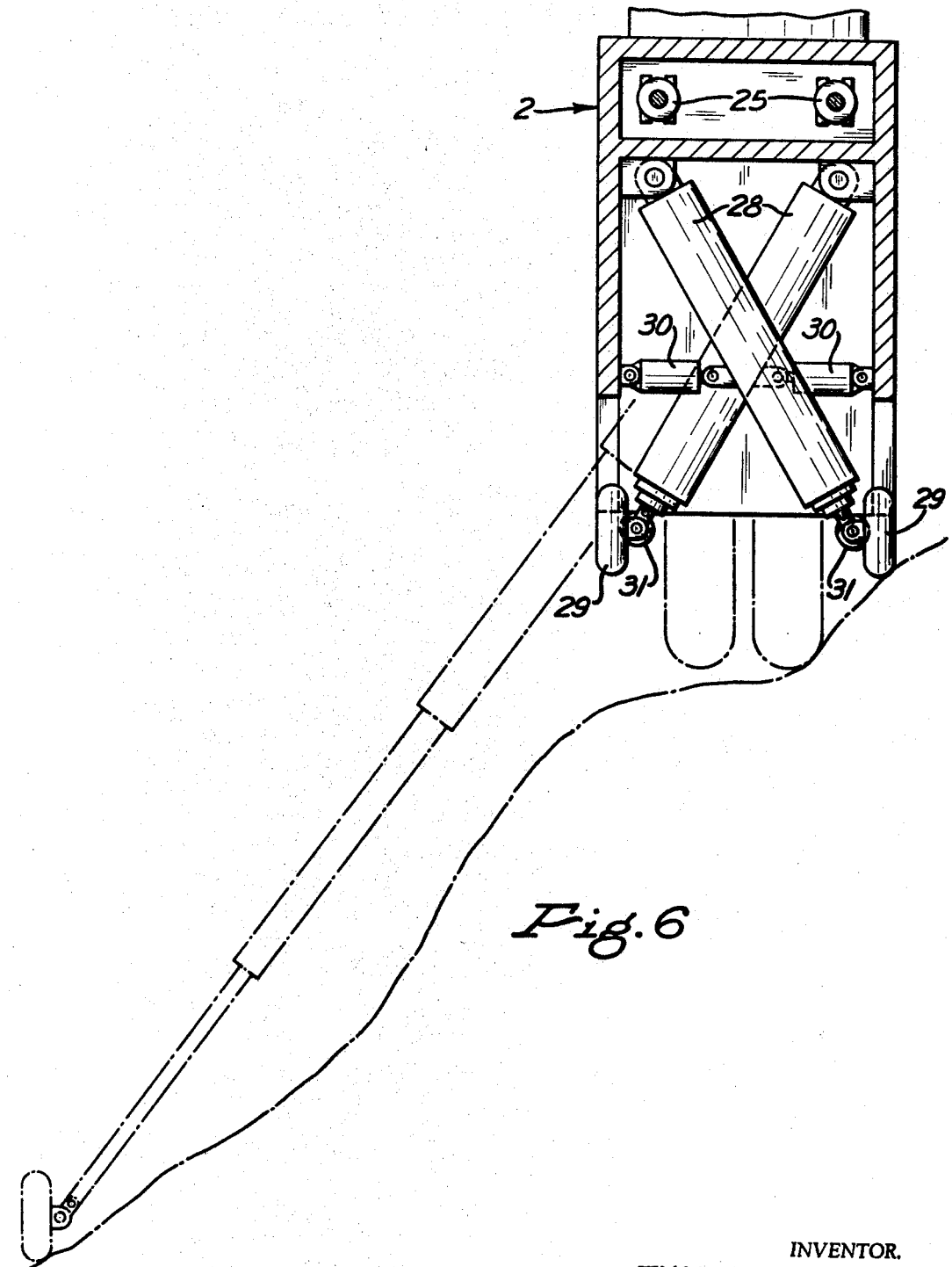
FIG. 6 is a vertical section taken on the line VI—VI of FIG. 5, showing how an outrigger leg would be extended and the wheels dropped if the ground contour were as shown in broken lines.

Referring to FIGS. 1 and 2 of the drawings, the vehicle is very low and narrow in relation to its length. The ratio of length to width may be more than 10 to 1. In fact, the vehicle is not much wider than necessary for accommodating within it a man. For example, it may be about 30 inches wide and have a body only four feet high. The narrowness of the vehicle will allow it to pass through narrow openings and passages and generally allow it to go almost anywhere a man can walk. The vehicle is formed from aligned front and rear body sections 1 and 2 that are made of armour plate to protect the occupants. The two sections are hinged together on a vertical axis by aligned hinge pins 3 extending through tongues 4 and brackets 5.

The opposite ends of the vehicle are provided with compartments, in each of which there is a set of dual wheels 7 journaled in bearings 8 connected to the lower ends of downwardly converging piston rods 9 projecting from cylinders 10. The upper ends of the cylinders are pivoted to the front and back walls of the compartments. Normally, the wheels project only a few inches below the bottom of the body sections and are therefore well protected. The wheels may be driven in any suitable manner, but preferably by electric or hydraulic motors 11 built into the centers of the wheels in a well-known manner and operated from a generator, engine or batteries 12 located in a compartment 13 in the front end of the rear body section. The operating controls (not shown) are in the main central compartment 14 of the rear section, where the operator of the vehicle sits. By delivering fluid under pressure to the upper ends of cylinders 10 from a pump 15 in compartment 13, the body sections can be raised relative to the wheels to prevent the vehicle from dragging on obstructions or high spots on the ground.

In order to steer the vehicle, the hinged ends of the body sections are swung laterally to left or right, thereby pointing the front end of the vehicle in the opposite direction. This can be accomplished, as shown best in FIG. 4, by at least one pressure cylinder 16 between the sections and pivotally connected with them. When fluid under pressure is delivered to either end of this cylinder, it and its piston rod 17 will swing the adjacent ends of the body sections laterally in one direction or the other as indicated by dotted lines in FIG. 1.

If such a vehicle, in which the front wheels are protected by a wall in front of them, heads into a bank or sharp rise in the ground, the front end of the vehicle may space the front wheels from the rise so that they cannot roll up it. Provision is therefore made for lifting the front end of the vehicle so that the back wheels can drive it forward until the projecting portions of the front wheels engage the rise and are able to climb up it. This is accomplished by hinging the front body section to the rear section on a horizontal transverse axis. Also, after the front wheels of such a long vehicle have passed over a rise in the ground the central portion may catch on the rise. It is therefore desirable to be able to hump up the central portion of the vehicle so that it can continue to move forward until the rear wheels have likewise passed over the rise. This humping can be done by pivoting the two sections together on a horizontal transverse axis, preferably different from the one first mentioned, so that one pivot can be disposed at the top of the vehicle in front of the vertical pivot and the other at the bottom of the vehicle behind the vertical pivot.

For this purpose, as shown in FIGS. 2 and 5, a front hinge 20 and a rear hinge 21 can be used. The front hinge is secured to the top of the front body section and a heavy plate 22 from which tongues 4 project. The rear hinge is secured to the bottom of the rear body section and another heavy plate 23 that supports brackets 5. A pair of fluid pressure cylinders 24, pivotally mounted in the rear end of the front body section are connected to the bottom of front plate 22. Another pair of fluid pressure cylinders 25, pivotally mounted the front end of the rear body section, are connected to the top of the rear plate 23. These cylinders normally hold the two plates flat against the body sections as shown. When fluid pressure is delivered to the front ends of cylinders 24 the front end of the vehicle will be lifted as indicated by dotted lines in FIG. 2. If, on the other hand, pressure is supplied to the rear ends of cylinders 25, the adjacent ends of the two body sections will be raised, pivoting on hinge 21.

Due to the narrowness of this vehicle, it could easily turn over on rough or sloping ground. To prevent this from occurring, the vehicle is provided with outrigger legs 28 that can be projected from opposite sides of the vehicle to contact with the ground to stabilize the vehicle, as shown in FIG. 2. The two legs are pivotally connected to the upper part of the front of the rear body section on parallel axes inside the vehicle, as shown in FIG. 6, and extend downward across each other. Each leg preferably is formed from telescoping fluid pressure cylinders, from the lowest cylinder of which a piston rod projects and carries a wheel 29 on its outer end. In the telescoped condition of the legs, the bottoms of their wheels are on the same level as the bottoms of main wheels 7 and support the front end of the rear body section when the front end of the vehicle is lifted relative to the rear body section. When fluid under pressure is delivered to either of the legs, its cylinders are extended to move wheels 29 downwardly. At the same time, the leg extends laterally away from the vehicle because it is held in a position inclined to the vertical by means of a small positioning cylinder 30 (FIG. 6) connected to it and to the side wall of the vehicle. The length of each leg and its angle to the vehicle can thus be controlled.

As shown in FIG. 2, each outrigger leg is braced from behind by an extendable brace 31, preferably formed from a fluid pressure cylinder and piston rod. The rear end of each brace is connected to the bottom of the vehicle and its front end is connected to the outer end of one of the legs by universal joints. As a leg is extended, its brace also is extended and is held that way by fluid pressure in the brace cylinder until it is time to retract the leg.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An articulated warfare vehicle comprising aligned elongated front and rear armoured body sections, means hinging said sections end to end on a vertical axis, wheels journaled in the rear end of the rear section and the front end of the front section and projecting below them, means for driving said wheels, means between said body sections for swinging the hinged ends of the sections laterally in order to steer the vehicle, normally retracted outrigger legs connected to the front end of the rear section, means for projecting said legs laterally from opposite sides of the vehicle into contact with the ground to stabilize the vehicle, means hinging the body sections together on a horizontal transverse axis, and means for swinging the front section upwardly on said transverse axis.

2. A vehicle according to claim 1, in which said steering means includes fluid pressure cylinders connecting the adjacent ends of said front and rear body sections.

3. A vehicle according to claim 1, in which said transverse axis is at the top of the vehicle near one side of said vertical axis, the vehicle including means at its bottom near the opposite side of the vertical axis hinging the body sections together on a horizontal transverse axis, and means for swinging the hinged ends of the vehicle upwardly on said last-mentioned transverse axis.

4. A vehicle according to claim 1, including means for raising said body sections relative to said wheels.

5. A vehicle according to claim 1, including an extendable brace for each outrigger leg, and universal joints connecting one end of each brace to the outer end of a leg and connecting the other end of the brace to said rear body section behind the leg.

6. A vehicle according to claim 5, in which said braces are formed from telescoping fluid pressure cylinders.

7. A vehicle according to claim 1, in which said outrigger legs legs include telescoping fluid pressure cylinders carrying ground-engaging members at their outer ends.

8. A vehicle according to claim 7, in which said outrigger legs cross each other and have upper ends pivoted to said rear body section on axes extending lengthwise of the vehicle.

9. A vehicle according to claim 8, including means for swinging the outrigger legs laterally outward.

References Cited

UNITED STATES PATENTS

| | | |
|---|---|---|
| 2,883,774 | 4/1959 | Clifford. |
| 3,057,319 | 10/1962 | Wagner. |
| 3,122,850 | 3/1964 | Rockwell. |
| 3,326,312 | 6/1967 | Buller _____ 180—51 X |

A. HARRY LEVY, *Primary Examiner.*